United States Patent
Ma (10) Patent No.: US 8,832,600 B2
(45) Date of Patent: Sep. 9, 2014

(54) METHOD, SYSTEM, AND PROGRAM FOR NAVIGATING FILES

(75) Inventor: Steven K. Ma, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2585 days.

(21) Appl. No.: 10/766,673

(22) Filed: Jan. 27, 2004

(65) Prior Publication Data

US 2005/0166189 A1    Jul. 28, 2005

(51) Int. Cl.
*G06F 3/048*    (2013.01)
*G06F 9/45*    (2006.01)

(52) U.S. Cl.
USPC ............................ 715/853; 715/713; 717/136

(58) Field of Classification Search
USPC ................................... 715/853, 713; 717/136
See application file for complete search history.

(56) References Cited

U.S. PATENT DOCUMENTS

| | | | |
|---|---|---|---|
| 5,983,244 A | 11/1999 | Nation | |
| 5,987,474 A | 11/1999 | Sandifer | |
| 6,223,142 B1 * | 4/2001 | Bargh et al. | 703/15 |
| 6,292,806 B1 | 9/2001 | Sandifer | |
| 6,393,429 B1 * | 5/2002 | Yagi et al. | 707/102 |
| 6,633,312 B1 * | 10/2003 | Rochford et al. | 715/736 |
| 7,191,411 B2 * | 3/2007 | Moehrle | 715/855 |
| 7,216,301 B2 * | 5/2007 | Moehrle | 715/811 |
| 7,370,281 B2 * | 5/2008 | Weber | 715/769 |
| 2002/0107855 A1 | 8/2002 | Nishi | |
| 2002/0152090 A1 | 10/2002 | Kobayashi et al. | |
| 2003/0188171 A1 | 10/2003 | DeCenzo et al. | |
| 2004/0070594 A1 * | 4/2004 | Burke | 345/716 |
| 2005/0114769 A1 * | 5/2005 | Arkhipov et al. | 715/531 |
| 2007/0143439 A1 * | 6/2007 | Szabo et al. | 709/217 |

FOREIGN PATENT DOCUMENTS

| | | |
|---|---|---|
| EP | 0 573 171 | 4/2001 |
| EP | 1 168 235 | 1/2002 |
| EP | 1 225 766 | 7/2002 |
| EP | 1 302 883 | 4/2003 |

* cited by examiner

*Primary Examiner* — Boris Pesin
*Assistant Examiner* — Matthew Ell
(74) *Attorney, Agent, or Firm* — David W. Victor; Konrad, Raynes, Davda and Victor LLP (57) ABSTRACT

Provided are a method, system, and program for rendering a display of at least one data set name, wherein each data set is associated with one or more file components. A selection of one displayed data set name is received and names of the file components associated with the selected data set are displayed. Selection is received of at least one of the displayed file component names and the selected data set name and selected at least one selected file component name are rendered in a history panel, wherein the selected data set name and selected at least one file component are displayed in a hierarchical tree arrangement.

27 Claims, 8 Drawing Sheets

METHOD, SYSTEM, AND PROGRAM FOR NAVIGATING FILES

BACKGROUND OF THE INVENTION

1. Field of the Invention

The present invention relates to a method, system, and program for navigating files.

2. Description of the Related Art

In an application development environment, software developers may work at workstations and download program files, such as source code files, they need from a host system. The source code programs being developed may be organized into data sets, where the data set may have a name including qualifier components that provide descriptive information on the files associated with that data set. For instance, a data set may have one qualifier providing some descriptive name, another qualifier indicating the type of program being developed, e.g., Cobol, C++, Java™, etc., and then another qualifier indicating the type of files, e.g., source code, object code, dynamic libraries, etc. (Java is a trademark of Sun Microsystems, Inc.)

A developer may search the host for data sets whose name qualifiers satisfy certain search criteria. Upon locating those data sets, the developer user interface would then download from the host all data sets that satisfy the search criteria and their file members to the developer workstation. The developer user interface may then render a hierarchical tree representation of the data sets and component files where the data sets are displayed at a same hierarchical level and the member files of each data set are displayed as children or branches of the data sets in which they are a member. The user may then peruse different data sets and member files by traversing the rendered hierarchical tree representations of the retrieved data sets and components. The hierarchical tree may be quite large and time consuming to navigate when the tree displays nodes for data sets having thousands of member files.

SUMMARY

Provided are a method, system, and program for rendering a display of at least one data set name, wherein each data set is associated with one or more file components. A selection of one displayed data set name is received and names of the file components associated with the selected data set are displayed. Selection is received of at least one of the displayed file component names and the selected data set name and selected at least one selected file component name are rendered in a history panel, wherein the selected data set name and selected at least one file component are displayed in a hierarchical tree arrangement.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
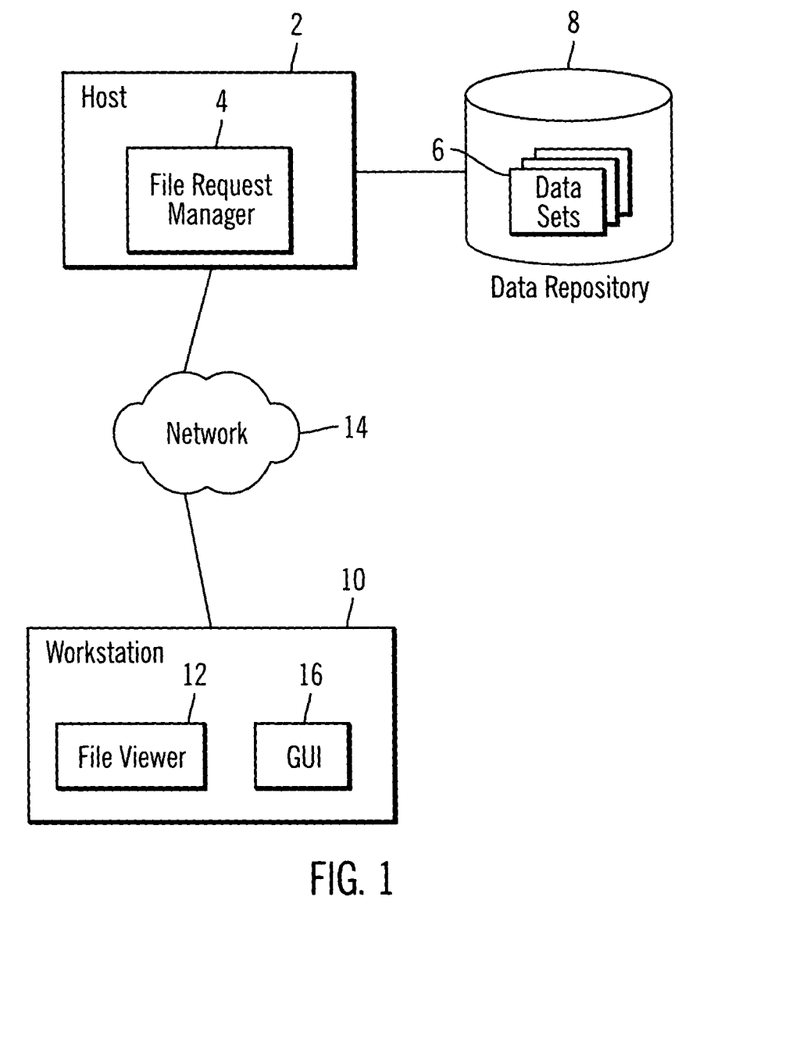
FIG. 1 illustrates a computing environment in which embodiments of the invention are implemented.

FIG. 1 illustrates a computing environment in which embodiments of the invention are implemented. A host system 2 includes a file request manager 4 program to handle access requests to data sets 6 maintained in a data repository 8. A workstation 10 includes a file viewer 12 program that is capable of issuing requests for data sets over a network 14 to the host file request manager 4 to access data sets 6 in the data repository 8. Each data set 6 may include one or more member components, such as files. In certain embodiments, the data set 6 member may comprise source code programs and the user of the workstation 10 comprises a developer using the file viewer 12 to access and view source code programs included in the data sets 6. In certain embodiments, the file viewer 12 may submit Structured Query Language (SQL) database queries to the file request manager 4, such that the file viewer 12 operates as a database client and the file request manager as a database server. In additional embodiments, the search requests may be communicated using additional search or file system protocols or formats known in the art.

The file viewer 12 may render a graphical user interface (GUI) 16 to enable a user of the workstation 10 to view and peruse displayed requested data sets 6 and perform file system related operations with respect to component files of the data sets 6, such as moving a file to a specified directory, deleting a file, renaming a file, creating a file, etc.

The host system 2 and workstation 10 may comprise computing devices known in the art, such as a server class machine, mainframe, workstation, desktop computer, etc. The data repository 8 may comprise one or more storage devices known in the art, such as one or more interconnected disk drives configured as a Redundant Array of Independent Disks (RAID), Just a Bunch of Disks (JBOD), Direct Access Storage Device (DASD), as a tape storage device, a single or multiple storage units, e.g., a tape library, or etc. The network 14 may comprise a network known in the art, such as a Local Area Network (LAN), Storage Area Network (SAN), wireless network, the Internet, and Intranet, etc.

In certain embodiments, the host 2 and workstation 10 may be part of an integrated development environment (IDE) for developing program applications, such as COBOL, PL/I, assembler, Java™, etc. For instance, the host 2 and workstation 10 may include IDE software, such as the International Business Machines Corporation ("IBM®") WebSphere® Studio Enterprise Developers (WSED) and Eclipse technology used for team software application development. (IBM and WebSphere are registered trademarks of IBM). IBM WSED provides a flexible, portal-like integration of multi-language, multi-platform and multi-device application development tools for building, testing and deploying dynamic applications. Further details of the WebSphere product are disclosed in the IBM publication "WebSphere Product Family Overview and Architecture", IBM document no. SG24-6963-00 (December 2003), which publication is incorporated herein by reference in its entirety.

Each data set 6 in the data repository 8 may use a naming convention having name qualifiers, including a high level qualifier (HLQ), middle level qualifier (MLQ), and a low level qualifier (LLQ). For instance, the naming convention of the data sets may have the format of "HLQ.MLQ.LLQ". Each data set 6 could have thousands of member component files.

Figure 2:
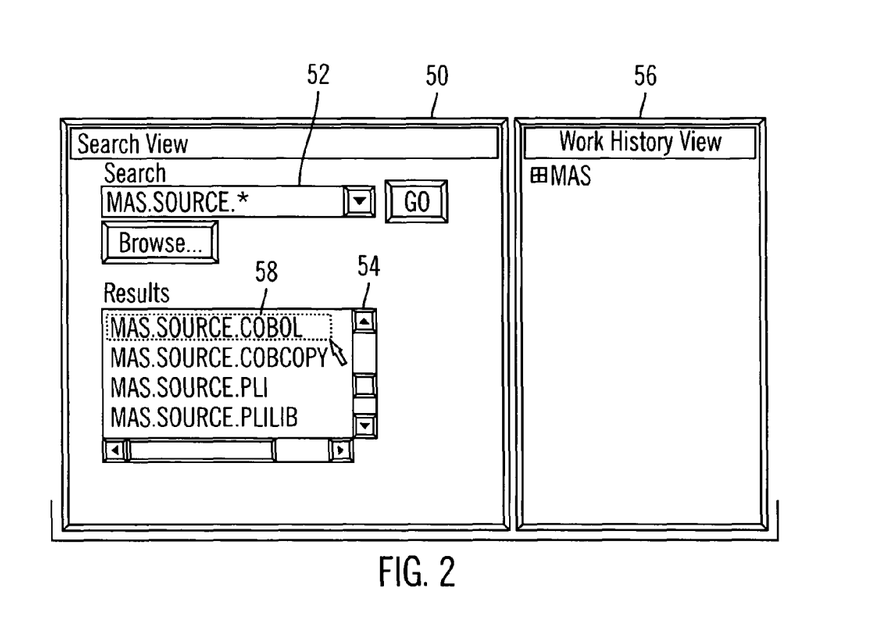
FIGS. 2-8 illustrate an example of Graphical User Interface (GUI) panels displaying accessed files.

FIGS. 2-8 illustrate a sequence of panels rendered in the GUI 16 to display information on data sets and their member file components to dynamically populate the work history tree view 56. FIG. 2 illustrates a search view panel 50 including a search box 52 in which the user may enter one or more data set name qualifiers, e.g., the HLQ and/or MLQ qualifiers, to retrieve all data sets having a name that includes the qualifiers specified in the search request. A results box 54 displays those data set names having high level and/or mid-level qualifiers that satisfy those specified in the search box 52 A work history view 56 displays those previously and currently selected data sets and member component files therein. After the initial search is submitted and before a data set name is selected, the work history view 56 displays only the high level qualifier in the initial search, e.g., "MAS".

Figure 3:
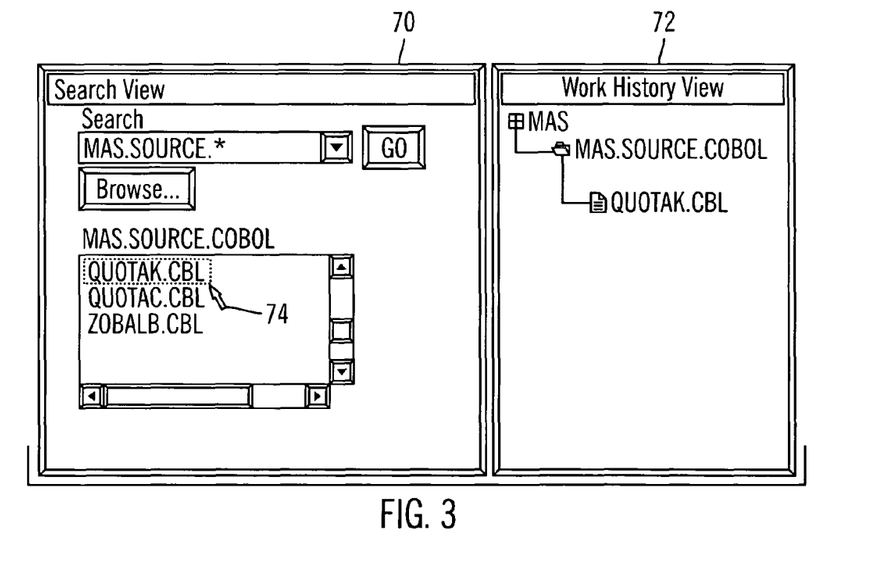

Upon the user selecting one of the displayed data set results, e.g., 58, the file viewer 12 would render and cause the display of the search view 70 and work history view 72 in FIG. 3. The search view 70 shows the member file components of the selected data set, e.g., "MAS.SOURCE.CO-BOL", which has three Cobol files (.cbl). FIG. 3 further illustrates a user pointer 74 selecting one of the component files of the previously selected data set, e.g., "QUO-TAK.CBL". The file viewer 12 would further update the work history view 72 to display all previously and currently selected data sets and components of a selected data set.

Figure 4:
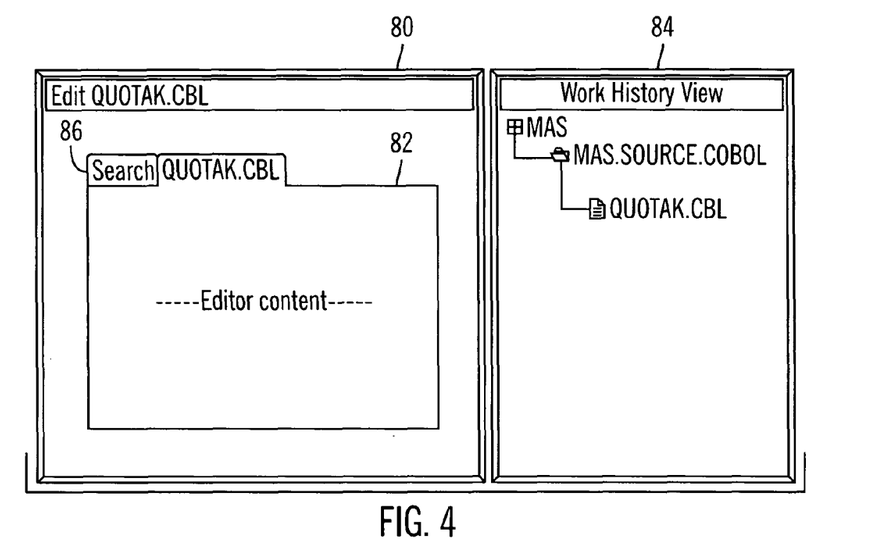
Figure 5:
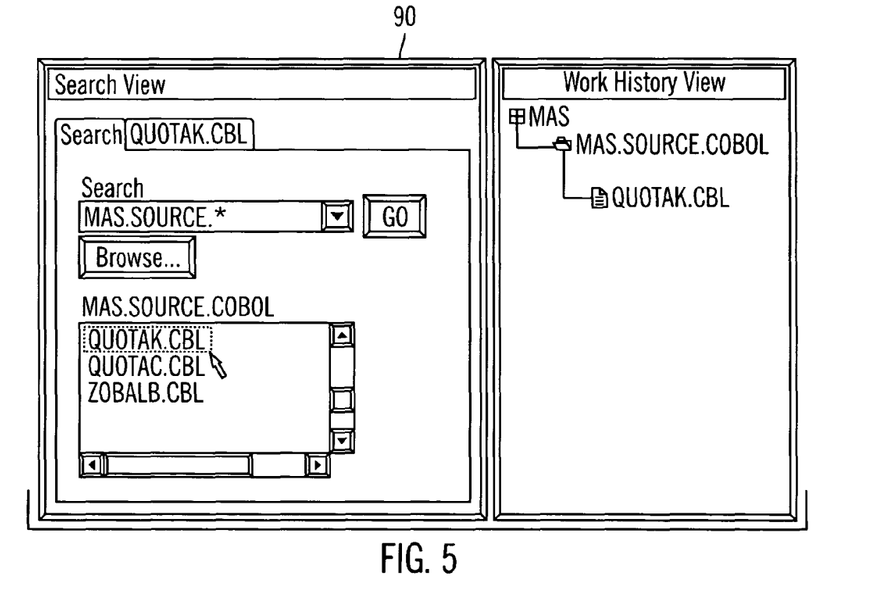

In response to the user selecting one of the component files of a data set, e.g., QUOTAK.CBL, in the search view 70 of FIG. 3, the file viewer 12 would render an edit panel 80, as shown in FIG. 4, including the content 82 of the selected component file QUOTAK.CBL. The work history panel 84 continues to display all previously and currently selected data sets and component files. Upon completing the editing of the content 82 of the file QUOTAK.CBL, the user may return to the search view by selecting the search tab 86 (FIG. 4). In response, the file viewer 12 would render the search view 90 in FIG. 5, which returns to the previous search view before the file was selected to edit.

Figure 6:
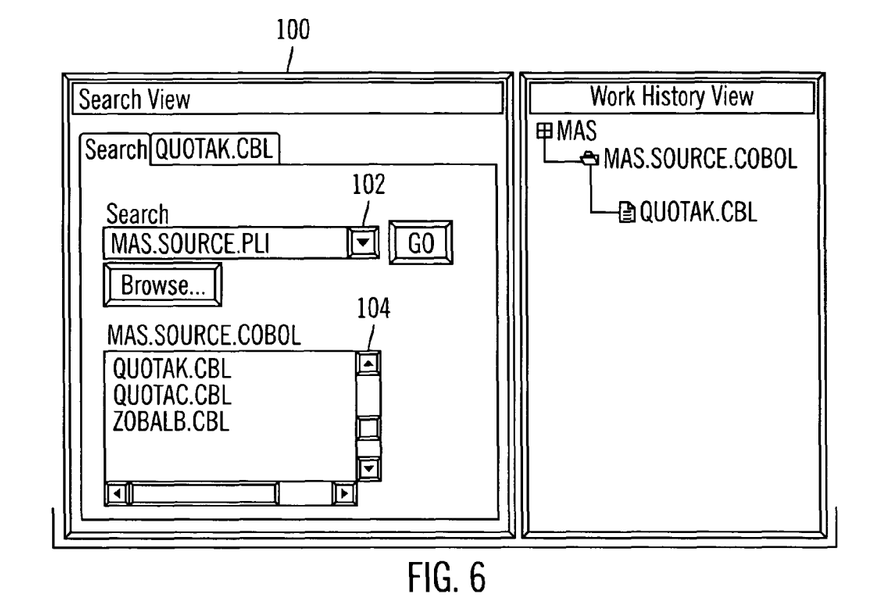

FIG. 6 illustrates the user entering in search view 100 the high, middle and low level qualifiers in the search box 102 to cause the display in the results box 104 of all the member components of the data set included in the search field.

Figure 7:
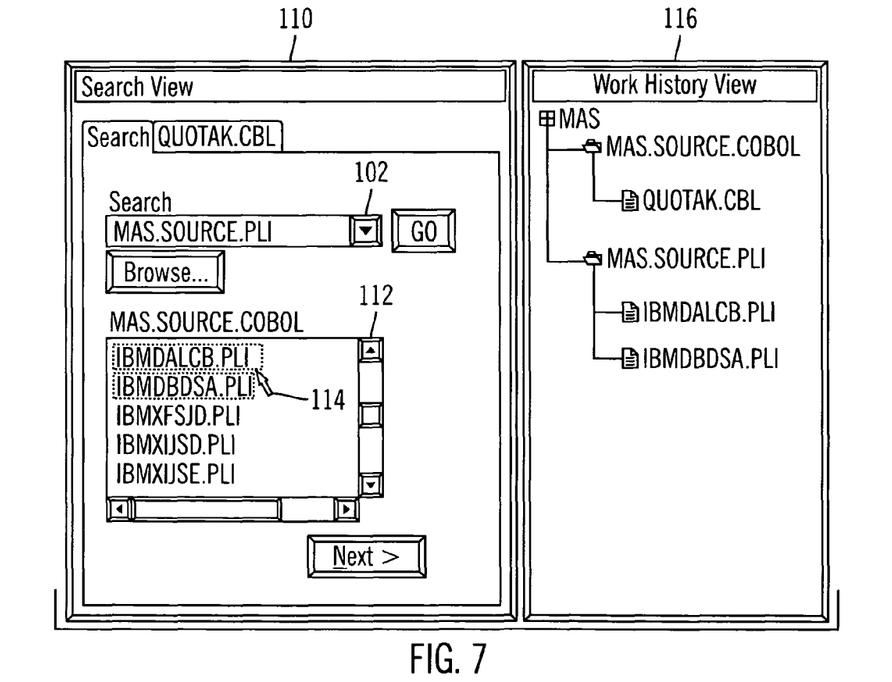

FIG. 7 illustrates a panel 110 the file viewer 12 displays in response to the user invoking the search entered in the search box 102 (FIG. 6), which includes the display in results box 112 of the component files of the data set resulting from the search that specified all qualifiers of a data set name. FIG. 7 further illustrates the user graphical pointer 114 selecting two files in the located data set, e.g., "IBMDALCB.PLI" and "IBMDBDSA.PLI". The file viewer 12 further renders in work history view 116 the previously selected and searched upon data set, e.g., "MAS.SOURCE.PLI" and the currently selected component files within that data set to further fill out the hierarchically displayed work history view 116 displaying all previously and currently selected data sets and component files of selected data sets.

Figure 8:
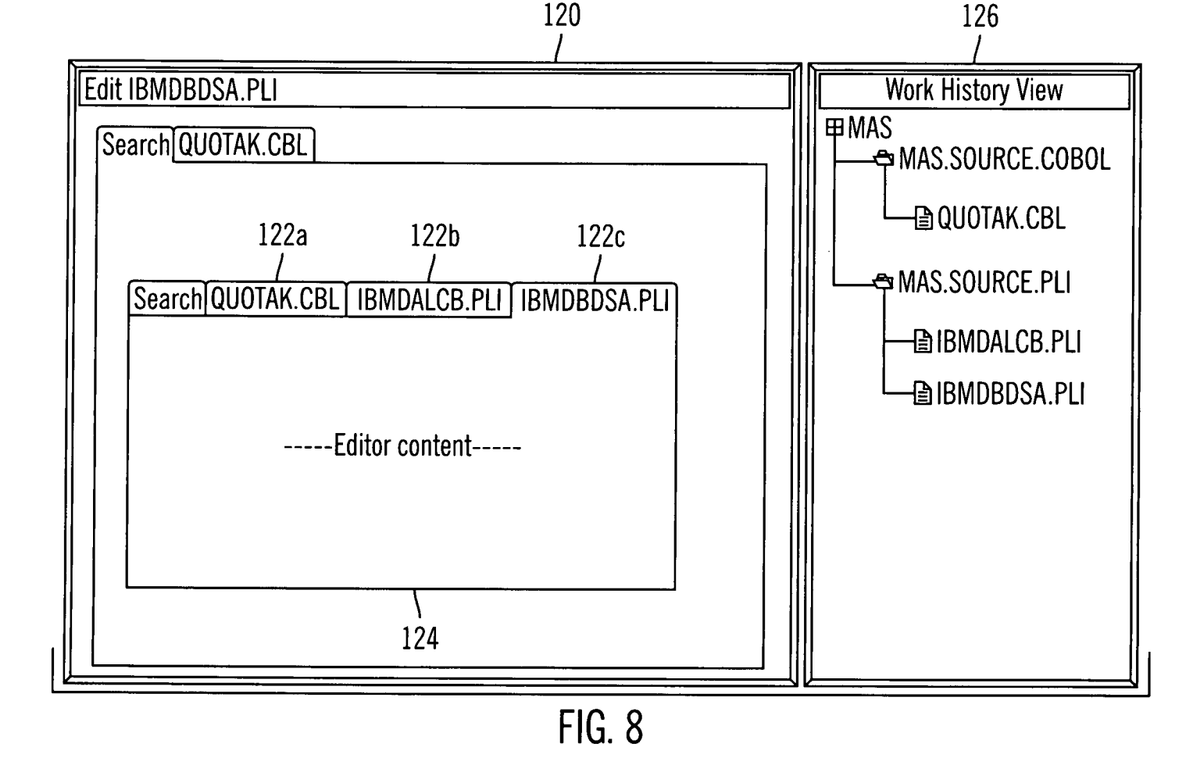

FIG. 8 illustrates a panel 120 rendered in response to the user selecting the files IBMDALCB.PLI" and "IBMDBD-SA.PLI" in the results box 112 in FIG. 7. The panel 120 displays tabs 122a, 122b, 122c, to enable the user accessing previously and currently selected component files of previously and currently selected data sets. In FIG. 8, content 124 of the selected file "IBMDBSA.PLI" is available for editing. In certain embodiments, the user may cause the display of the content of any previously and currently selected component file by selecting the tabs 122a, 122b, 122c or selecting the file name listed in work history view 126.

Figure 9:
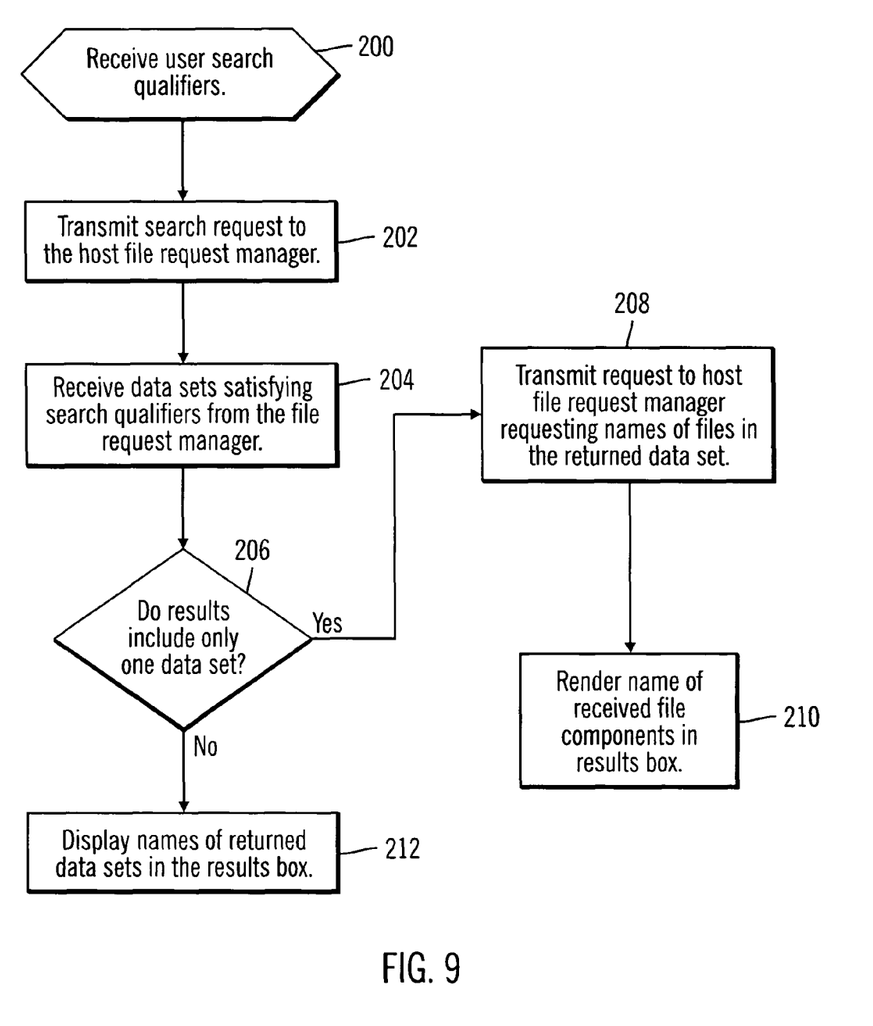
FIGS. 9 and 10 illustrate operations performed to access and display information on selected data sets and component files.

FIGS. 9 and 10 illustrate operations the file viewer 12 performs in response to receiving user actions in the GUI 16. With respect to FIG. 9, in response to the user submitting (at block 200) search qualifiers in the search box, the file viewer 12 transmits (at block 202) the search request to the host file request manager 4 over the network 14. Upon receiving (at block 204) one or more data set names satisfying the submitted search qualifiers from the file request manager 4, if (at block 206) the result includes only one data set name, then the file viewer 12 transmits (at block 208) a request to the host file request manager 4 requesting the names of files within the returned data set. The file viewer 12 renders (at block 210) the name of the received file components in the results box, e.g., the results box in FIG. 3. If (at block 206) multiple names of data sets were returned, then the names of the data sets are rendered (at block 212) in the results box, e.g., results box 54 (FIG. 2).

Figure 10:
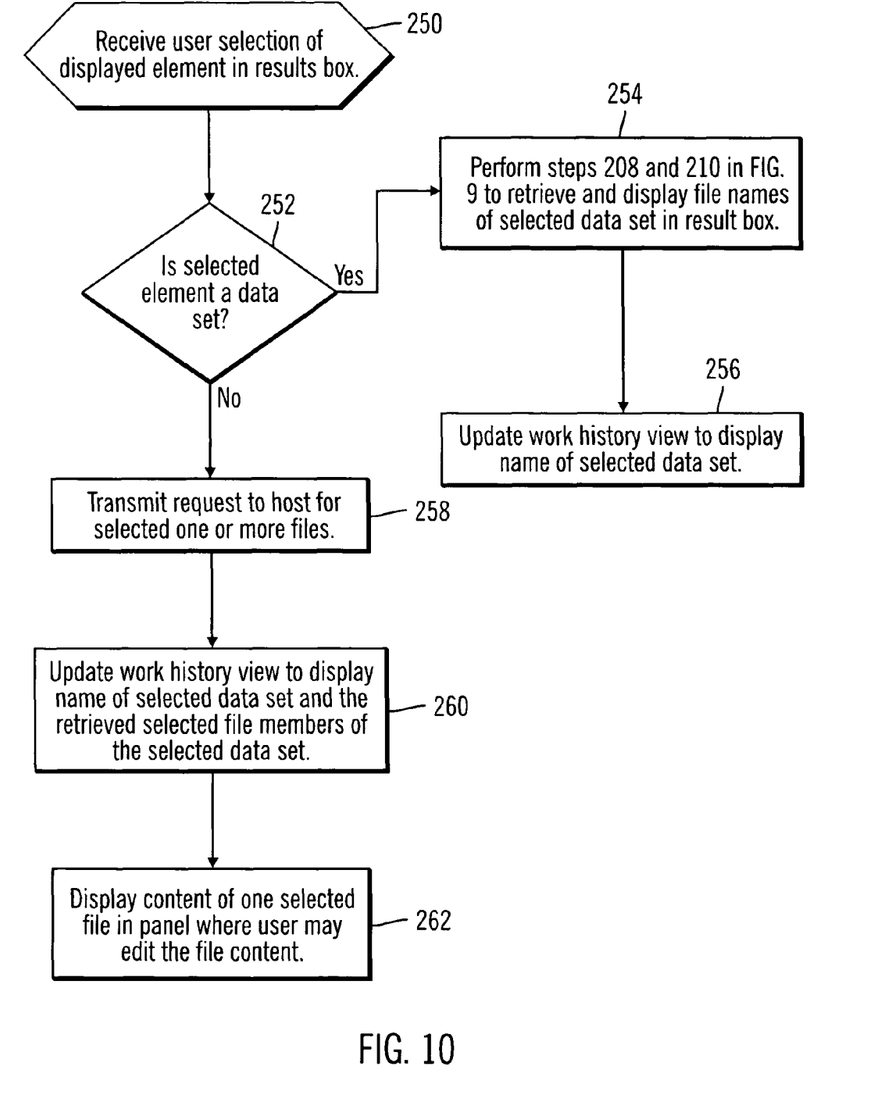

FIG. 10 illustrates operations the file viewer 12 performs in response to receiving (at block 250) user selection of a displayed element in the results box, e.g., 74 (FIG. 3) and 112 (FIG. 7). If (at block 252) the selected element is a data set, then the file viewer 12 performs (at block 254) steps 208 and 210 in FIG. 9 to retrieve and display the file names in result box. An element may comprise either a data set name or a file component of a data set, or any other data structure. The file viewer 12 further updates (at block 256) the work history view to display the name of the selected data set, e.g., work history view 72 (FIG. 3) and 116 (FIG. 7). If (at block 252) the selected element is a component file of a data set, then the file viewer 12 transmits (at block 258) the request to the host for the selected one or more component files. The work history view is updated (at block 260) to display the name of selected data sets and the retrieved selected file components of the selected data set, e.g., work history view 72 (FIG. 3) and 116 (FIG. 7). The content of one selected file is displayed (at block 262) in the panel where the user may edit the file content, e.g., panels 82 (FIG. 4), 124 (FIG. 8). In this way, the workstation 10 receives and buffers selected component files of a selected data set, not all component files of a data set.

With described embodiments, only those data sets and file components that the user selects are rendered in the GUI of the file viewer to reduce delays that may occur to locate and download all data sets or all files within a data set. With certain described embodiments, data sets and component files are only downloaded and displayed in response to user action with respect to selected data sets and components. Still further, by rendering the names of only the selected data sets and file components in the work history view, the hierarchical view does not become cluttered with numerous elements, especially in situations where data sets may have numerous component files. In this way, the hierarchical tree displayed in the work history view contains only the relevant members and data sets selected by the user, thus making it usable, manageable, and faster to load. Thus, the user need not have to scroll up and down a tree view displaying all the numerous component files associated with a data set because only those of interest, i.e., currently or previously selected, are displayed in the hierarchical tree of the work history view.

Further, in certain embodiments, the hierarchical tree provides a visual display of the user work history in conjunction with the search view. The work history view tree gets populated every time a user open a data set or component file in the result table. As the user continues to work with data sets and component files, the number of elements in the tree displayed in the work history view grows.

Yet further, in described embodiments, the user may perform operations with respect to the data sets and component files displayed in the work history view, such as select to open, delete, move a file component to another data set displayed in the tree, etc. Further, the user may add a file to a data set displayed in the work history view, which would then be provided to the host 2 to store in the data repository 8 as part of the data set 6 to which the component file was added.

Additional Embodiment Details

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described embodiments may be used in an Integrated Development Environment (IDE), where a developer accesses application programs organized in data sets. In alternative embodiments, the described embodiments may be used with any file management system.

In described embodiments, different data sets may provide component files in different programming languages, e.g., COBOL, PLI, etc., languages.

In described embodiments, data sets are returned whose name qualifiers satisfy the search criteria. In alternative embodiments, other information associated with a data set may be compared with the search criteria, such as data set metadata within a data set.

FIGS. 2-8 illustrate examples of GUI panels. However, in further embodiments the information shown in FIGS. 2-8 may be rendered in a different manner than shown, with additional or different user selectable and display options.

FIGS. 9 and 10 describe specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 11:
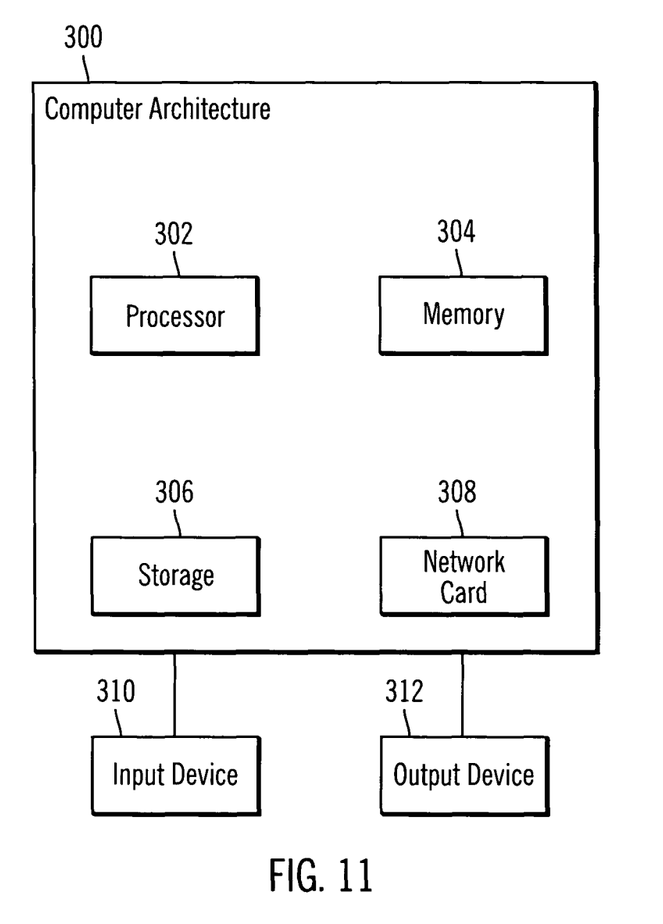
FIG. 11 illustrates a computing architecture that may be used to implement the computing environment described with respect to FIG. 1.

FIG. 11 illustrates one implementation of a computer architecture 300 of the host system 2 shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:

rendering a display of names of a first and second data sets in a search panel, wherein each data set is associated with one or more file components;

receiving selection of the displayed first data set name in the search panel;

displaying names of the file components associated with the selected first data set in the search panel;

receiving selection of at least one of the displayed file component names associated with the selected first data set;

rendering the selected data set name and the selected at least one selected file component name in a history panel, wherein the selected first data set name and selected at least one file component are displayed in a hierarchical tree arrangement, and wherein the history panel and the search panel are rendered concurrently in a graphical user interface;

receiving selection of the displayed second data set name in the search panel;

displaying names of the file components associated with the selected second data set in the search panel;

receiving selection of at least one of the displayed file component names associated with the selected second data set; and rendering the selected second data set name and the selected at least one selected file component name associated with the selected second data set in the history panel, wherein the selected first and second data set names and selected file component names associated with the first and second data sets are displayed together in the hierarchical tree arrangement to display previously and currently selected data set names and file component names of the selected data sets and wherein the rendered selected first and second data set names and the selected file component names in the history panel are rendered concurrently in the graphical user interface with the search panel separately rendering the selected displayed file component names associated with the selected second data set name.

2. The method of claim 1, wherein the first and second data set names are displayed as a parent at a higher hierarchical level to the file component names associated with the displayed first and second data set names, wherein the file component names are rendered as children in the history panel of the first or second data set with which they are associated.

3. The method of claim 1, further comprising:
receiving at least one search qualifier;
transmitting a request for data set names that satisfy the received at least one search qualifier, wherein the displayed data set names comprise data set names returned in response to the transmitted request whose name satisfies the at least one search qualifier.

4. The method of claim 1, further comprising:
transmitting a request for file component names of the selected data set name, wherein the displayed file component names comprise file component names returned in response to the transmitted request for file component names.

5. The method of claim 1, wherein different data sets include source code files in different programming languages.

6. The method of claim 1, further comprising:
receiving user action with respect to one selected data set name or file component name displayed in the history panel, wherein the action specifies an operation to perform with respect to the selected data set name or file component name.

7. The method of claim 6, wherein the operation is a member of a set of operations comprising deleting the selected data set or file component and moving the selected file component to another data set.

8. The method of claim 1, further comprising:
displaying content of the selected file component in a content panel displayed with the history panel to enable editing of the displayed content.

9. The method of claim 1, wherein the file components include source code files being accessed by a developer.

10. A system, comprising:
a processor;
a computer readable medium including a file viewer executed by the processor to perform operations, the operations comprising:
rendering a display of names of a first and second data sets in a search panel, wherein each data set is associated with one or more file components;
receiving selection of the displayed first data set name in the search panel;
displaying names of the file components associated with the selected first data set in the search panel;
receiving selection of at least one of the displayed file component names associated with the selected first data set;
rendering the selected data set name and the selected at least one selected file component name in a history panel, wherein the selected first data set name and selected at least one file component are displayed in a hierarchical tree arrangement, and wherein the history panel and the search panel are rendered concurrently in a graphical user interface;
receiving selection of the displayed second data set name in the search panel;
displaying names of the file components associated with the selected second data set in the search panel;
receiving selection of at least one of the displayed file component names associated with the selected second data set; and
rendering the selected second data set name and the selected at least one selected file component name associated with the selected second data set in the history panel, wherein the selected first and second data set names and selected file component names associated with the first and second data sets are displayed together in the hierarchical tree arrangement to display previously and currently selected data set names and component file names of the selected data sets, and wherein the rendered selected first and second data set names and the selected file component names in the history panel are rendered concurrently in the graphical user interface with the search panel separately rendering the selected displayed file component names associated with the selected second data set name.

11. The system of claim 10, wherein the first and second data set names are displayed as a parent at a higher hierarchical level to the file component names associated with the displayed first and second data set names, wherein the file names are rendered as children in the history panel of the first or second data set with which they are associated.

12. The system of claim 10, wherein the operations further comprise:
receiving at least one search qualifier;
transmitting a request for data set names that satisfy the received at least one search qualifier, wherein the displayed data set names comprise data set names returned in response to the transmitted request whose name satisfies the at least one search qualifier.

13. The system of claim 10, wherein the operations further comprise:
transmitting a request for file component names of the selected data set name, wherein the displayed file component names comprise file component names returned in response to the transmitted request for file component names.

14. The system of claim 10, wherein different data sets include source code files in different programming languages.

15. The system of claim 10, wherein the operations further comprise:
receiving user action with respect to one selected data set name or file component name displayed in the history panel, wherein the action specifies an operation to perform with respect to the selected data set name or file component name.

16. The system of claim 15, wherein the operation is a member of a set of operations comprising deleting the selected data set or file component and moving the selected file component to another data set.

17. The system of claim 10, wherein the operations further comprise:
displaying content of the selected file component in a content panel displayed with the history panel to enable editing of the displayed content.

18. The system of claim 10, wherein the file components include source code files being accessed by a developer.

19. An article of manufacture comprising a computer readable storage medium having code executed to perform operations, the operations comprising:

rendering a display of names of a first and second data sets in a search panel, wherein each data set is associated with one or more file components;

receiving selection of the displayed first data set name in the search panel;

displaying names of the file components associated with the selected first data set in the search panel;

receiving selection of at least one of the displayed file component names associated with the selected first data set;

rendering the selected data set name and the selected at least one selected file component name in a history panel, wherein the selected first data set name and selected at least one file component are displayed in a hierarchical tree arrangement, and wherein the history panel and the search panel are rendered concurrently in a graphical user interface;

receiving selection of the displayed second data set name in the search panel;

displaying names of the file components associated with the selected second data set in the search panel;

receiving selection of at least one of the displayed file component names associated with the selected second data set; and rendering the selected second data set name and the selected at least one selected file component name associated with the selected second data set in the history panel, wherein the selected first and second data set names and selected file component name associated with the first and second data sets are displayed together in the hierarchical tree arrangement to display previously and currently selected data set names and file component names of the selected data sets, and wherein the rendered selected first and second data set names and the selected file component names in the history panel are rendered concurrently in the graphical user interface with the search panel separately rendering the selected displayed file component names associated with the selected second data set name.

20. The article of manufacture of claim 19, wherein the first and second data set names are displayed as a parent at a higher hierarchical level to the file component names associated with the displayed first and second data set names, wherein the file names are rendered as children in the history panel of the first or second data set with which they are associated.

21. The article of manufacture of claim 19, wherein the operations further comprise:

receiving at least one search qualifier;

transmitting a request for data set names that satisfy the received at least one search qualifier, wherein the displayed data set names comprise data set names returned in response to the transmitted request whose name satisfies the at least one search qualifier.

22. The article of manufacture of claim 19, wherein the operations further comprise:

transmitting a request for file component names of the selected data set name, wherein the displayed file component names comprise file component names returned in response to the transmitted request for file component names.

23. The article of manufacture of claim 19, wherein different data sets include source code files in different programming languages.

24. The article of manufacture of claim 19, wherein the operations further comprise:

receiving user action with respect to one selected data set name or file component name displayed in the history panel, wherein the action specifies an operation to perform with respect to the selected data set name or file component name.

25. The article of manufacture of claim 24, wherein the operation is a member of a set of operations comprising deleting the selected data set or file component and moving the selected file component to another data set.

26. The article of manufacture of claim 19, wherein the operations further comprise:

displaying content of the selected file component in a content panel displayed with the history panel to enable editing of the displayed content.

27. The article of manufacture of claim 19, wherein the file components include source code files being accessed by a developer.

* * * * *